United States Patent
Newman et al.

(10) Patent No.: US 11,418,279 B1
(45) Date of Patent: Aug. 16, 2022

(54) RECOVERY AND DEMODULATION OF COLLIDED 5G/6G MESSAGE ELEMENTS

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: ULTRALOGIC 6G, LLC, Palos Verdes, CA (US)

(*) Notice: Subject to any disclaimer, the term of this patent is extended or adjusted under 35 U.S.C. 154(b) by 0 days.

(21) Appl. No.: 17/716,244

(22) Filed: Apr. 8, 2022

Related U.S. Application Data

(60) Provisional application No. 63/327,005, filed on Apr. 4, 2022, provisional application No. 63/321,879, filed on Mar. 21, 2022, provisional application No. 63/313,380, filed on Feb. 24, 2022, provisional application No. 63/272,352, filed on Oct. 27, 2021, provisional application No. 63/234,911, filed on Aug. 19, 2021, provisional application No. 63/220,669, filed on Jul. 12, 2021, provisional application No. 63/214,489, filed on Jun. 24, 2021, provisional application No. 63/210,216, filed on Jun. 14, 2021.

(51) Int. Cl.
*H04L 1/00* (2006.01)
*H04L 27/34* (2006.01)

(52) U.S. Cl.
CPC .......... *H04L 1/0003* (2013.01); *H04L 1/0061* (2013.01); *H04L 27/34* (2013.01)

(58) Field of Classification Search
None
See application file for complete search history.

(56) References Cited

U.S. PATENT DOCUMENTS

| 8,693,587 | B2 | 4/2014 | Giraud | |
|---|---|---|---|---|
| 11,153,780 | B1 * | 10/2021 | Newman | ............... H04W 24/06 |
| 11,159,357 | B1 * | 10/2021 | Cui | .......................... H04L 27/18 |
| 2006/0011482 | A1 | 6/2006 | Brommer | |
| 2007/0092018 | A1 | 4/2007 | Fonseka | |

(Continued)

FOREIGN PATENT DOCUMENTS

WO    WO-2013144886 A2 * 10/2013   ............ H04L 25/067

*Primary Examiner* — Anh Vu H Ly
(74) *Attorney, Agent, or Firm* — Mayer & Williams PC

(57) ABSTRACT

In a busy 5G/6G wireless network, message collisions may occur in which an "intruder" signal is transmitted at the same time as a "subject" message, rendering one or more of the subject message elements distorted. Modulation schemes are disclosed in which the corrupted message elements may be recovered, without requesting a retransmission. The modulation states have the property that, if two of the modulation states are combined by superposition, the resulting signal does not resemble any of the modulation states. Hence the receiver can determine, from the received signal, which message elements are collided, and can also identify the original modulation state of the subject message element in many cases. By replacing the collided message elements with the originally intended modulation state, the receiver may demodulate the subject message correctly while avoiding the delays and costs involved in requesting a retransmission, according to some embodiments.

20 Claims, 8 Drawing Sheets

```
16  o   =1+15 or 5+11 ──┬─ 137
15  •   MOD STATE
14  o   =3+11 or 7+7  ──┬─ 136
13  x   incompatible
12  o   =1+11 or 5+7  ──┬─ 135
11  •   MOD STATE
10  o   =3+7 or 5+5   ──┬─ 134
 9  x   incompatible
 8  o   =1+7 or 3+5   ──┬─ 133
 7  •   MOD STATE
 6  o   =1+5 or 3+3   ──┬─ 132
 5  •   MOD STATE ─────── 131
 4  o   =1+3
 3  •   MOD STATE
 2  ☆   =1+1          ──── 130
 1  •   MOD STATE
```

(56) References Cited

U.S. PATENT DOCUMENTS

| | | |
|---|---|---|
| 2008/0025323 A1* | 1/2008 | Khan .................. H04L 27/3488 |
| | | 370/400 |
| 2018/0035316 A1 | 2/2018 | Kim |
| 2020/0195486 A1 | 6/2020 | Atungsiri |
| 2020/0220649 A1 | 7/2020 | Liu |
| 2020/0295894 A1 | 9/2020 | Kang |
| 2021/0058269 A1 | 2/2021 | Zang |
| 2021/0084663 A1 | 3/2021 | Takeda |
| 2021/0135835 A1 | 5/2021 | Tsodik |
| 2021/0152409 A1 | 5/2021 | Pan |
| 2021/0258947 A1 | 8/2021 | Lee |
| 2021/0259018 A1 | 8/2021 | Hosseini |
| 2021/0344546 A1 | 11/2021 | Jia |
| 2022/0053467 A1 | 2/2022 | Blankenship |
| 2022/0103321 A1 | 3/2022 | Huss |
| 2022/0150022 A1* | 5/2022 | Newman .................. H04L 27/26 |
| 2022/0159614 A1* | 5/2022 | Newman ............. H04W 68/005 |
| 2022/0173954 A1* | 6/2022 | Newman ............... H04W 28/04 |

* cited by examiner

US 11,418,279 B1

RECOVERY AND DEMODULATION OF COLLIDED 5G/6G MESSAGE ELEMENTS

PRIORITY CLAIMS AND RELATED APPLICATIONS

This application claims the benefit of U.S. Provisional Patent Application Ser. No. 63/210,216, entitled "Low-Complexity Access and Machine-Type Communication in 5G", filed Jun. 14, 2021, and U.S. Provisional Patent Application Ser. No. 63/214,489, entitled "Low-Complexity Access and Machine-Type Communication in 5G", filed Jun. 24, 2021, and U.S. Provisional Patent Application Ser. No. 63/220,669, entitled "Low-Complexity Access and Machine-Type Communication in 5G", filed Jul. 12, 2021, and U.S. Provisional Patent Application Ser. No. 63/234,911, entitled "Short Demodulation Reference for Improved Reception in 5G", filed Aug. 19, 2021, and U.S. Provisional Patent Application Ser. No. 63/272,352, entitled "Sidelink V2V, V2X, and Low-Complexity IoT Communications in 5G and 6G", filed Oct. 27, 2021, and U.S. Provisional Patent Application Ser. No. 63/313,380, entitled "Short-Form 5G/6G Pulse-Amplitude Demodulation References", filed Feb. 24, 2022, and U.S. Provisional Patent Application Ser. No. 63/321,879, entitled "Low-Complexity Demodulation of 5G and 6G Messages", filed Mar. 21, 2022, and U.S. Provisional Patent Application Ser. No. 63/327,005, entitled "Recovery and Demodulation of Collided 5G/6G Message Elements", filed Apr. 4, 2022, all of which are hereby incorporated by reference in their entireties.

FIELD OF THE INVENTION

The disclosure pertains to wireless message demodulation, and particularly to methods for demodulating collided messages.

BACKGROUND OF THE INVENTION

When two wireless messages are transmitted on the same frequency at the same time, the signals "collide", or interfere with each other, generally producing a complex superposition signal which is incomprehensible to the receiver. What is needed is means for a receiver to recover the original message from the superposition waveform.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a user device, in signal communication with a base station of a wireless network, to modulate an uplink message comprising message elements, the method comprising: receiving, from the base station, a modulation scheme comprising one or more amplitude levels, one or more phase levels, and one or more modulation states, each modulation state comprising at least one of the amplitude levels and at least one of the phase levels, wherein each modulation state is unequal to all superpositions of any two modulation states; modulating each message element according to one of the modulation states; and transmitting the message to the base station; wherein a superposition of two modulation states comprises a signal produced by receiving the two modulation states overlapping in time.

In another aspect, there is non-transitory computer-readable media in a base station of a wireless network, the base station in signal communication with two or more user devices, the media including instructions that when executed in a computing environment cause a method to be performed, the method comprising: determining a plurality of modulation states of a modulation scheme, the modulation scheme comprising one or more amplitude levels and one or more phase levels, each modulation state comprising at least one of the amplitude levels and at least one of the phase levels, wherein each modulation state differs, in amplitude or phase or both, relative to all superpositions of any two modulation states; receiving a message comprising message elements; and for each particular message element, determining whether the particular message element is modulated according to one of the modulation states, and if so, demodulating the particular message element according to the modulation state.

In another aspect, there is a user device in signal communication with a base station of a wireless network, the user device configured to: receive, from the base station or the network, system information specifying a modulation scheme comprising a plurality of modulation states, each modulation state incompatible with all superpositions of any two other modulation states; modulate a message according to the modulation scheme; and transmit the message to the base station.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
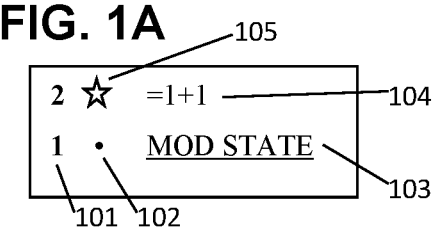
FIG. 1A is a schematic showing an exemplary embodiment of interference states in an on-off modulation scheme, according to some embodiments.

Systems and methods disclosed herein (the "systems" and "methods", also occasionally termed "embodiments" or "arrangements" or "versions", generally according to present principles) can provide urgently needed wireless communication protocols for recovering and demodulating messages despite collisions with other messages transmitted at the same time. The modulation states of a modulation scheme are configured so that none of the modulation states equals the superposition of two other modulation states. A transmitter can modulate a message according to those modulation states and thereby enable a receiver to demodulate the message elements even when collided with an intruder message that is modulated according to the same modulation scheme. For each message element, the correct demodulation may be unambiguous in some cases or, in other cases, may indicate a small number of possible modulation states which can then be tested according to an error-detection code. Recovery of collided messages may save time and energy by avoiding retransmissions. Embodiments disclosed below include versions with amplitude modulation, phase modulation, classical amplitude-phase modulation, and pulse-amplitude modulation schemes.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "sub-channel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "Classical" amplitude-phase modulation refers to message elements modulated in both amplitude and phase, whereas "PAM" (pulse-amplitude modulation) refers to separately amplitude-modulating two signals and then adding them with a 90-degree phase shift. The two signals may be called the "I" and "Q" branch signals (for In-phase and Quadrature-phase) or "real and imaginary" among others. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Most of the examples below relate to QPSK or 16QAM, with straightforward extension to the other levels of modulation. For example, 16QAM modulated according to PAM exhibits two phase levels at zero and 90 degrees (or in practice, for carrier suppression, ±45 degrees) and four amplitude levels including two positive and two negative, thus forming 16 distinct modulation states. For comparison, classical amplitude-phase modulation in 16QAM includes four positive amplitude levels and four phases of the raw signal, which are multiplexed to produce the 16 states of the modulation scheme. In addition, the extremely legacy "on-off" modulation refers to transmitting message bits with amplitude modulation in which one state has zero transmission. Communication in 5G and 6G generally takes place on abstract message "channels" (not to be confused with frequency channels) representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user devices, among other channels that may be in use. In addition, one or more random access channels may include multiple random access channels in a single cell. "CRC" (cyclic redundancy code) is an error-detection code. "RNTI" (radio network temporary identity) is a network-assigned user code. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like.

In addition to the 3GPP terms, the following terms are defined herein. Although in references a modulated resource element of a message may be referred to as a "symbol", this may be confused with the same term for a time interval ("symbol-time"), among other things. Therefore, each modulated resource element of a message is referred to as a "modulated message resource element", or more simply as a "message element", in examples below. A "demodulation reference" is a set of Nref modulated "reference resource elements" that exhibit levels of a modulation scheme (as opposed to conveying data). Thus integer Nref is the number of reference resource elements in the demodulation reference. A "calibration set" is one or more amplitude values (and optionally phase values), which have been determined according to a demodulation reference, representing the predetermined modulation levels of a modulation scheme. Generally the modulation scheme includes integer Nlevel predetermined amplitude or phase levels. Amplitudes may be specified in terms of an arbitrary "amplitude unit", such as 1 or 3 units of amplitude. A "superposition" or "sum-signal" of two modulation states is a signal produced by receiving the two modulation states simultaneously, so that the two modulation states overlap in time. A first modulation state is "consistent" or "compatible" with a superposition of two other modulation states if the amplitude and phase of the first modulation state are equal to the amplitude and phase of the superposition. Likewise, a first modulation state is "inconsistent" or "incompatible" with a superposition of two other modulation states if the first modulation state differs, in amplitude or phase, from the superposition of the two other modulation states.

"Low-complexity" refers to devices and procedures necessary for wireless communication, exclusive of devices and procedures that provide high-performance communication. 5G/6G specifications include many procedures and requirements that greatly exceed those necessary for wireless communication, in order to provide high-performance communications at low latency and high reliability for users that demand it. Compared to scheduled and managed 5G/6G messaging, low-complexity procedures generally require less computation and less signal processing. For example, low-complexity procedures may be tailored to minimize the number of separate operations required of a device per unit of time. 5G and 6G specifications include a very wide range of options and contingencies and versions and formats and types and modes for many operations, to achieve maximum flexibility. A low-complexity specification may include defaults for each operation, and those defaults may be the simplest choices, or at least simpler than standard 5G and 6G procedures. "Simpler" procedures generally require fewer computation steps and/or smaller memory spaces than corresponding procedures in standard 5G/6G. Computation steps may be measured in floating-point calculations, for example.

"Reduced-capability" refers to wireless devices that cannot comply with 5G or 6G protocols, absent the systems and methods disclosed herein. For example, regular 5G and 6G user devices are required to receive a 5 MHz bandwidth in order to receive system information messages. Regular user devices are required to perform high-speed signal processing such as digitizing the received waveform, applying digital filtering or Fourier transforming an incoming waveform, phase-dependent integrating at several GHz frequency, and separating closely-spaced subcarriers. A reduced-capability device, on the other hand, may not need the high performance gained by such procedures, and may be incapable of performing them. A reduced-capability device may be able to receive a narrow-band wireless signal, demodulate the message, and interpret the content without further processing.

Turning now to the figures, in a first example, states of an amplitude modulation scheme are disclosed, enabling recovery of an original "subject" message despite a second "intruding" message, according to some embodiments.

FIG. 1A is a schematic showing an exemplary embodiment of interference states in an on-off modulation scheme, according to some embodiments. As depicted in this non-limiting example, a highly schematic example involves just a portion of a modulation scheme, to illustrate message collision mitigation in a particular case. The received amplitude is indicated in the first column (1 or 2 in this case, arbitrary units), and the type of state (dot for a modulation state, circle for ambiguous state, star for unambiguous state, and x for incompatible state) is indicated symbolically in the second column and further explained in the third column, for each amplitude value. A first state is a modulation "on" state 101 with amplitude 1 unit and symbolized as a dot 102 to indicate that it is a modulation state ("MOD STATE") of the modulation scheme, as indicated 103. A second state 104, with amplitude 2 units as indicated, is not one of the modulation states, but instead is the superposition signal when two of the modulation states are transmitted at the same time. For example, a first user device may transmit a first (subject) message to a base station, and a second user device may transmit a second (intruding) message at the same time. The two user devices have previously adjusted their transmitted power levels and clock frequencies as directed by the base station, so the subject message and the intruding message are synchronous and arrive at the base station with the same received amplitude of one unit. The two signals therefore interfere constructively, producing a resultant superposition with twice the amplitude of the first signal, as suggested by the formula 104. For example, if the two signals each have an amplitude of 1 unit, the received sum-signal has an amplitude of 2 units. In the disclosed embodiment, the receiver can recognize the collision according to the received amplitude being a sum-signal value of 2 units. Because this amplitude can only be produced by two simultaneous transmissions of 1 unit, the receiver can recover the original value of the subject signal by dividing the received signal by 2. The receiver can determine, from the received signal amplitude of 2 amplitude units, that both signals had the same amplitude of 1 unit, and therefore the subject signal must have had an amplitude of 1 unit. Hence the receiver can unambiguously demodulate the message element of the subject signal as having an amplitude of 1 unit, and the unambiguous state is indicated by a star 105. In some embodiments, the receiver may ignore the intruding message. In other embodiments, the receiver may attempt to demodulate the intruding message as well as the subject message.

Figure 1B:
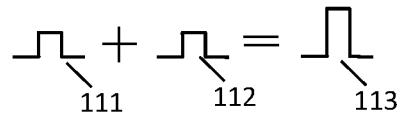
FIG. 1B is a schematic showing an exemplary embodiment of two signals interfering, according to some embodiments.

FIG. 1B is a schematic showing an exemplary embodiment of two signals interfering, according to some embodiments. As depicted in this non-limiting example, a first signal pulse 111 arrives at a receiver at the same time as an intruding signal pulse 112 (with the same phase, frequency, an amplitude), thereby forming a superposition 113 with twice the amplitude. The interfering user devices have been adjusted by the base station to have the same as-received amplitude, clock frequency, phase, and timing (as is normal for 5G and 6G networks). The receiver, upon receiving the superposition 113, can determine that the received amplitude is 2 units, thereby implying that two signals of 1 unit amplitude were transmitted at the same time, and therefore that the original first signal message element was transmitted with 1 amplitude unit. Thus the receiver can demodulate the first signal message element unambiguously despite the interference.

Figure 1C:
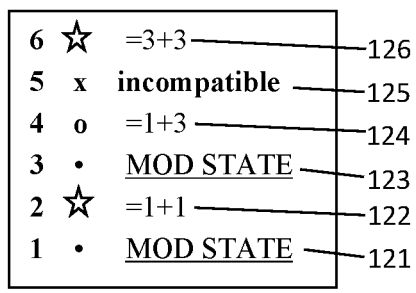
FIG. 1C is a schematic showing an exemplary embodiment of interference states in a two-level amplitude-modulation scheme, according to some embodiments.

FIG. 1C is a schematic showing an exemplary embodiment of interference states in a two-level amplitude-modulation scheme, according to some embodiments. As depicted in this non-limiting example, a subject message is transmitted with modulation according to a modulation scheme that has two modulation states, with amplitudes of 1 unit and 3 units, respectively. If another user device transmits an intruding message element, modulated according to the same scheme (and previously synchronized and power-adjusted by the same base station), a collision results. Depending on which modulation state is transmitted by the subject and intruder signals, the as-received superposition can have several different amplitudes. For example, a superposition with an amplitude of 2 units 122 is due to a collision of two message elements with 1 amplitude unit, as described above. Since the 2-unit state 122 involves two identical inputs, demodulation is unambiguous as indicated by a star. Likewise, a superposition with an amplitude of 6 units 126 must have been a 3+3 collision, and therefore the subject message element must have had an amplitude of 3 units. On the other hand, a superposition with 4 amplitude units 124 is the result of a 1-unit signal colliding with a 3-unit signal, and is indicated as ambiguous. The 4-unit signal 124 is ambiguous because the receiver cannot determine which user device (the subject or the intruder) transmitted which signal. The subject message element could be either the 1-unit signal or the 3-unit signal. The ambiguous state 124 is indicated by a "o" logo, whereas the unambiguous states 122 and 126 are indicated by a star.

The receiver may recover the intended subject message element, from a collided 4-unit amplitude signal, by demodulating the message element twice, once for each of the possible contributing amplitude levels, and then testing the resulting message versions with an associated error-detection code. For example, the receiver may demodulate the message in two versions, one with the collided message element assigned to the 1-unit state 121 and the other version with the ambiguous message element assigned to the 3-unit state 123. The receiver can then select the correct version by comparing the message to an embedded parity or error-detection code, or by determining whether one of the versions is nonsense or improperly formatted, or by comparing each version of the message to an expected message type, or otherwise.

The figure also shows a 5-unit sum-signal 125 labeled as "incompatible", meaning that the 5-unit amplitude is incompatible with all the modulation states, such that no combination of the modulation states (that is, the 1-unit and 3-unit amplitude states) can produce the 5-unit signal. If a receiver receives a 5-unit signal 125, the receiver can determine that the message is somehow corrupted and may request a retransmission. Alternatively, the receiver may attempt to recover the intended subject message element by constructing multiple versions of the message according to each of the modulation states and testing each version against an error-detection code associated with the subject message.

In most cases, it is not necessary for the receiver to test all of possible versions of the ambiguous or faulted message elements, because the correct version is likely to be found before all the possibilities have been explored. The receiver generally tests versions of the message until finding the one version that agrees with the error-detection code, and then stops. On average, the number of version tests required to find the right one is about one-half the maximum number of possible versions.

To summarize: the receiver can unambiguously demodulate the received signal in the 1-unit state 121 or the 3-unit state 123 because they are modulation states of the modulation scheme. The receiver can also unambiguously demodulate the 2-unit superposition state 122 and the 6-unit superposition state 126 because they uniquely represent the 1-unit and 3-unit states respectively. The receiver can demodulate the 4-unit superposition state 124 as either the 1-unit or the 3-unit state, and can select among them by comparing each version of the message to a parity or other error-detection code, for example. If the receiver detects the 5-unit signal, then the receiver may determine that the message is irretrievably corrupted, or the receiver may try each of the modulation states and select the one that agrees with an error-detection code.

Figure 1D:
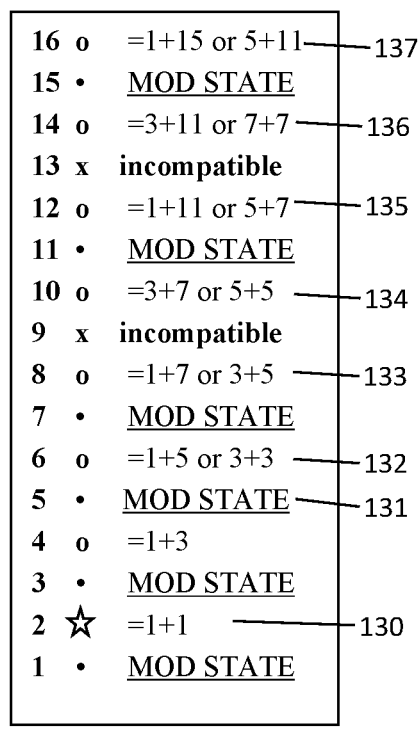
FIG. 1D is a schematic showing an exemplary embodiment of interference states in a six-level amplitude-modulation scheme, according to some embodiments.

FIG. 1D is a schematic showing an exemplary embodiment of interference states in a six-level amplitude-modulation scheme, according to some embodiments. As depicted in this non-limiting example, 16 as-received sum-signal types are shown according to the amplitude of the received signal (that is, 1-16 amplitude units), type inferred from the amplitude (modulation state, ambiguous, unambiguous, and incompatible), and the superposition components where relevant. The 5-unit state is now a modulation state 131 in this example. The 2-unit state 130 is unambiguous, corresponding to two 1-unit transmissions at the same time. The 9-unit and 13-unit states are incompatible with the modulation scheme (that is, unable to be constructed by superposition of any two of the modulation states). With the additional modulation states, there are now six ambiguous superposition states 132, 133, 134, 135, 136, 137, each of which can be constructed from the modulation states in more than one way. The receiver can attempt to demodulate those ambiguous signals by testing each of the component amplitude values as indicated in the figure. For example, upon receiving the 8-unit signal 133, the receiver can prepare message versions with the collided message element assigned to each one of the component amplitude levels, namely 1, 3, 5, and 7 units, and select the correct assignment using an error-detection code.

The example indicates that, as the number of modulation states is increased, the number of possible component states in a collided message element also increases. Therefore a network may select the number of modulation states in the modulation scheme as a compromise between the information-carrying density of the message elements versus the number of component values that must be tested to recover a collided message element.

Arranging and testing the message versions can take substantial time and computing power. Before starting the search for the correct version, the receiver can calculate the number of versions likely needed to find the original message. If the predicted number of versions is too large, the receiver can request a retransmission instead.

In summary, the modulation states are selected so that no modulation state equals the superposition of two other modulation states. Hence, the message elements configured as one of the modulation states are intrinsically unambiguous. The other unambiguous message elements are superpositions with only one choice for the contributing modulation states, such as a 2-unit signal. Finally, the ambiguous message elements may be demodulated by testing the message with each of the component amplitude values substituting for the collided message element and comparing to an error-detection code. An incompatible state is likely faulted by noise or complex interference, in which case the receiver may attempt to recover the message by testing all of the modulation states in place of the faulted message element, or it may request a retransmission.

An advantage of transmitting using specific modulation states, selected so that no modulation state can be formed from the superposition of any two other modulation states, may be that message collisions with other like-modulated transmissions may be recovered. Another advantage may be that the receiver may determine which message elements are collided, according to their modulation level, and thereby avoid wasting time varying the uncollided message elements. Another advantage may be that the number of message versions needed to demodulate each collided message element, may be a small number because only certain combinations of the modulation states could add to the observed signal, thereby reducing the number of versions that the receiver may need to test. Another advantage may be to identify "incompatible" states which cannot be constructed from any two of the modulation states.

Another advantage may be that the disclosed procedures are low-complexity involving elementary arithmetic and logic which may be compatible with devices that may have difficulty complying with prior-art procedures. Another advantage may be that the disclosed procedures may be implemented as a software (or firmware) update, without requiring new hardware development, and therefore may be implemented at low cost, according to some embodiments. The disclosed procedures may be implemented as a system or apparatus, a method, or instructions in non-transient computer-readable media for causing a computing environment, such as a user device, a base station, or other signally coupled component of a wireless network, to implement the procedure. Particular embodiments may include one, some, or none of the above-mentioned advantages. Other advantages will be apparent to one of ordinary skill in the art, given this teaching. This comment applies additionally to other embodiments and lists of advantages provided below. The advantages listed in this paragraph are true for each of the lists of advantages in examples below.

Figure 2:
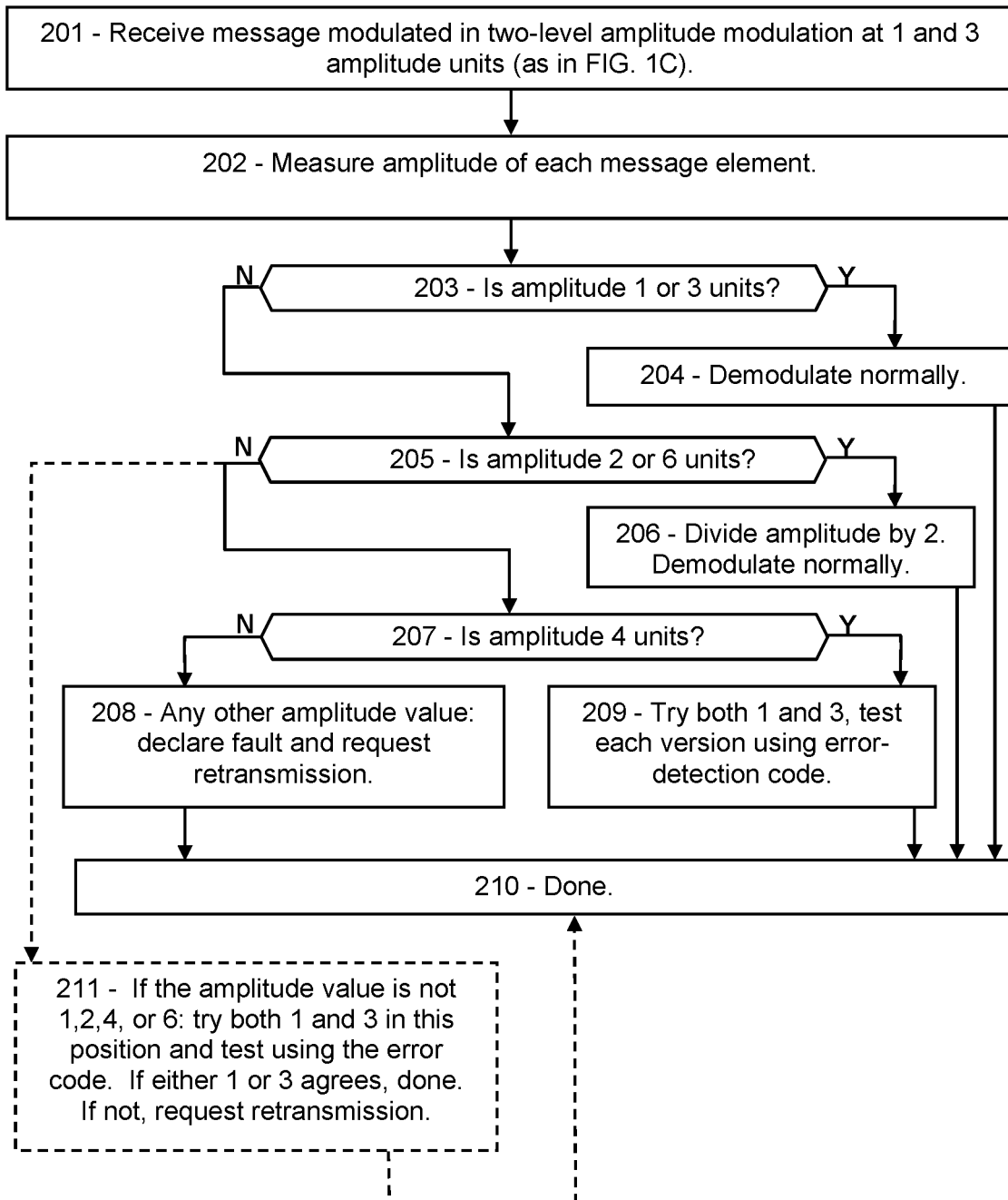
FIG. 2 is a flowchart showing an exemplary embodiment of a process for demodulating an amplitude-modulated message with interference, according to some embodiments.

FIG. 2 is a flowchart showing an exemplary embodiment of a process for demodulating an amplitude-modulated message with collisions, according to some embodiments. As depicted in this non-limiting example, at 201 a receiver receives a message, each message element originally modulated according to either 1 or 3 amplitude units, however some of the message elements may be collided with another like-modulated intruder signal. At 202, the receiver measures the amplitude of each message element, and at 203 selects the message elements that have an amplitude of 1 or 3 units, and at 204 demodulates them normally, for example by comparing to a calibration set of predetermined amplitude levels exhibited by a demodulation reference, and then assigning a numerical code (associated with each modulation state or each amplitude level in the calibration set) to each message element accordingly.

For the message elements not equal to 1 or 3 amplitude units, at 205 the receiver determines whether each element is 2 or 6 units in amplitude, and if so, divides the amplitude by 2 and demodulates normally at 206. Of the remaining message elements, the receiver asks at 207 if the amplitude is 4 units, in which case the receiver can try both 1 and 3 amplitude units in that collided message element at 209. The receiver can thereby determine, according to an error-detection code, which version of the message is correct.

If the message element amplitude is none of the above values, then at 208 the receiver can declare a faulted message and request a retransmission, or it can try altering the faulted message element or elements to each of the modulation states and thereby find the correct message. After all the message elements have been demodulated, the task is done at 210.

As an alternative, shown in dash, after determining that the message element amplitude is not 1, 2, 3, or 6 amplitude units, the receiver can bypass the other steps and, at 211, can try varying each of the remaining message elements to each of the modulation states. If there are more than one faulted message element, the receiver can vary them in a nested grid search covering all possible modulation states for each the faulted message elements in various combinations, and testing each variation against the error-detection code. If any of those combinations agrees with the error-detection code, the message is properly demodulated. If not, the receiver can abandon the message, request a retransmission, or other action depending on network rules.

The foregoing examples pertain to amplitude modulated messages using certain selected amplitude states as modulation states. In contrast, the following examples provide phase modulation states that can enable recovery of collided messages, according to some embodiments.

Figure 3A:
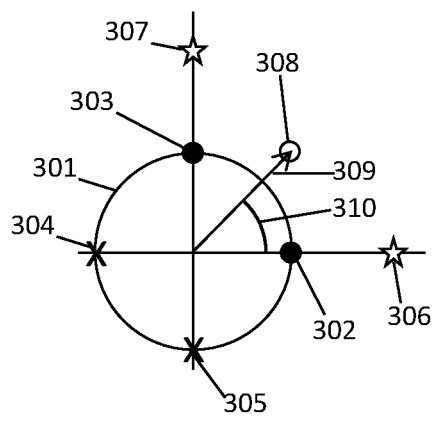
FIG. 3A is a phase chart showing an exemplary embodiment of states in a two-level phase-modulation scheme, according to some embodiments.

FIG. 3A is a phase chart showing an exemplary embodiment of modulation states in a two-level phase-modulation scheme, according to some embodiments. As depicted in this non-limiting example, modulation states of a phase-modulation scheme are shown in a polar plot with amplitude radially and phase azimuthally. A circle 301 represents a single amplitude, such as 1 unit of amplitude. The modulation states are shown as dots 302 and 303 on that circle 301. The angular positions of the dots 302, 303 indicate their phase as 0 and 90 degrees, respectively. Two more locations, 304 and 305, are shown as "x" indicating that they are not used as modulation states. (The reason for excluding those states 304, 305 is to avoid destructive interference. For example, if the subject message is modulated according to 302 and an intruder signal is modulated at the opposite state 304, the resulting superposition would be zero amplitude, which may confuse the receiver.) The depicted scheme may be termed "2PSK" having only two modulation states 302, 303 separated by one phase step of 90 degrees. All of the modulation states, and the superposition signals from collisions, are restricted to one quadrant of the phase chart, to avoid destructive interference.

Two colliding modulation states can produce one of three possible superposition signals 306, 307, 308 depending on which modulation states are present in the subject and intruder signals. One unambiguous state 306 (star) is the resultant of a first signal modulated with the modulation state 302, plus an intruder modulated with the same modulation state 302, thereby doubling the amplitude but leaving the phase unchanged. The receiver, upon detecting a message element with zero phase and an amplitude of 2 units, can deduce that both the subject message and the intruder signal are modulated as 302, and thereby demodulate the message element unambiguously by dividing the amplitude by 2. Likewise, the receiver can receive a message element exhibiting the amplitude and phase of unambiguous state 307, with an amplitude of 2 units and 90 degrees of phase, in which case the receiver can demodulate the message element as if it were the modulation state 303.

In addition there is the ambiguous state 308, due to the superposition of a 302 signal added to a 303 signal. The amplitude of the 308 state is about 1.4 amplitude units, as shown by an arrow 309, and the phase is 45 degrees, as shown by the angle 310. The state 308 is ambiguous because the receiver cannot determine, from the amplitude and phase, whether the subject message is the 302 or the 303 modulation state. If the subject message includes a parity check or an error-detection code such as a CRC code, then the receiver can demodulate the subject message twice, once with each of the two choices (302 and 303) for the ambiguous message element, and testing each version against the parity or CRC, and if one of the versions is in agreement, the task is done. If neither version is in agreement, the receiver may request a retransmission, among other options.

An advantage of modulating messages according to the two-phase modulation scheme of FIG. 3A, may be that collided message elements may exhibit the unambiguous states 306 or 307, which enable straightforward demodulation, or the ambiguous state 308, which can be demodulated according to each of the possible contributing amplitude levels. In this way the message may be recovered despite intrusion interference by another transmitter using the same modulation scheme.

Figure 3B:
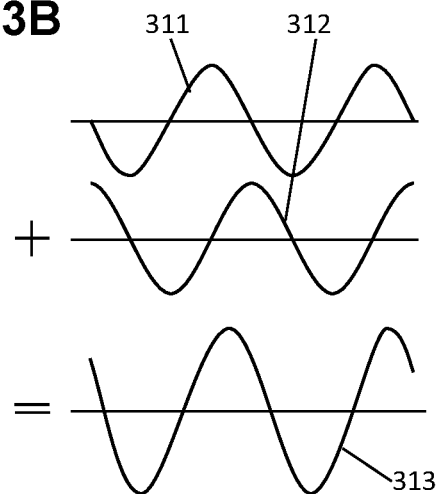
FIG. 3B is a schematic showing an exemplary embodiment of interfering phase-modulated waves, according to some embodiments.

FIG. 3B is a schematic showing an exemplary embodiment of interfering phase-modulated waves, according to some embodiments. As depicted in this non-limiting example, two waves 311 and 312, represent the signals from the subject message and the intruder, respectively. These waves may represent the first signal modulated as the modulation state 302 and an intruder wave modulated at the modulation state 303, that is, at the same amplitude but differing in phase by 90 degrees. The receiver receives a single superposition signal 313 equal to the combination of those two waves 311, 312. The superposition has an amplitude of 1.414 units and a phase of 45 degrees as shown. The receiver, detecting the wave 313 modulated as the state 308, may deduce that two signals are interfering, in which one signal has zero degrees and the other one has 90 degrees. The superposition signal is ambiguous because the receiver cannot determine which of those component waves is due to the subject signal. To demodulate the message and recover the subject message element, the receiver can prepare two demodulated message versions, one with the collided message element assumed to be the zero-degree modulation state and the other with the collided message element assumed to be the 90-degree modulation state, while checking both versions against an error-detection code or parity. Although such testing takes time and computational energy, it involves substantially less time and energy than requesting, receiving, and analyzing a retransmitted version when only a few of the message elements are collided, and therefore may be worth the effort to recover the message. However, if too many message elements are collided in the ambiguous state 308, or are otherwise faulted, then the receiver can request a retransmission without attempting a search that is likely to require an excessive search effort.

Figure 3C:
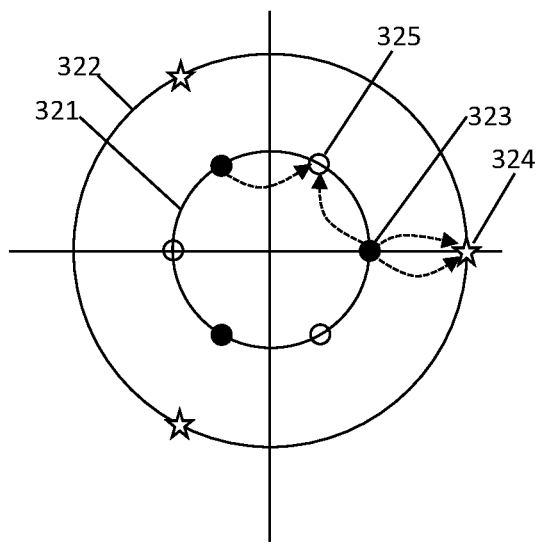
FIG. 3C is a phase chart showing an exemplary embodiment of states in a three-level phase-modulation scheme, according to some embodiments.

FIG. 3C is a phase chart showing an exemplary embodiment of modulation states in a three-level phase-modulation scheme, according to some embodiments. As depicted in this non-limiting example, three modulation states are indicated as dots 323, on a circle 321 representing an amplitude of 1 unit, at 120 degree intervals. The modulation scheme may be termed 3PSK, with three modulation states. A second circle 322 represents 2 amplitude units. When a subject message element and an intruder signal are both modulated according to the same modulation state, the resulting superposition has twice the original amplitude and the same phase, such as state 324. The collision, combining two of the amplitude-1 phase-0 modulation states, is indicated by dotted arrows. The resulting superposition state 324 is unambiguous because both of the contributing modulation states 323 are identical, and there is no other combination of two modulation states that result in the same state 324. Hence the receiver can demodulate the state 324, with an amplitude of 2 units and a phase of 0, as if it were the modulation state 323. The three unambiguous states are shown as stars to indicate that the receiver can demodulate them by dividing the amplitude by 2 and treating them as the corresponding modulation state.

In another case, the subject message element and the intruder signal may have different modulation states. In that case, the resulting superposition would have the same 1-unit amplitude, and a phase midway between the two components. For example, the signal 325 is the result of a collision between two modulation states separated by one phase step, as indicated by dotted arrows. Such collided states 325 are ambiguous because the receiver generally does not know which of the components corresponds to the subject message element. Therefore, the receiver may demodulate the subject message two ways, inserting each of the two component modulation states into the two message versions, testing each version against a parity or error-detection test.

Figure 3D:
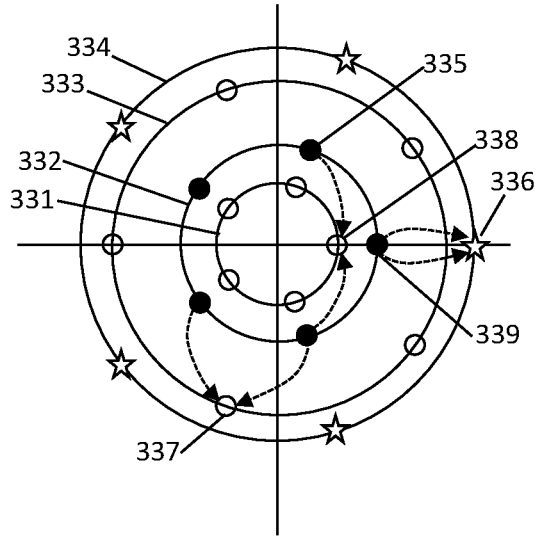
FIG. 3D is a phase chart showing an exemplary embodiment of states in a five-level phase-modulation scheme, according to some embodiments.

FIG. 3D is a phase chart showing an exemplary embodiment of states in a five-level phase-modulation scheme, according to some embodiments. As depicted in this non-limiting example, a modulation scheme has five modulation states 335 on a unit amplitude circle 332, separated by a phase step of 72 degrees. The modulation scheme may be termed 5PSK. If a subject message element and an intruder signal both have the same modulation state, their signals combine to produce an unambiguous superposition signal at twice the amplitude (circle 334) and the same phase. The receiver can demodulate this signal by dividing the amplitude by 2, or by substituting the same-phase modulation state for the collided message element. For example, the signal 336 is formed by a collision of two simultaneous transmissions of the modulation state 339, as indicated by dotted arrows. The receiver, upon detecting a 2-unit amplitude signal, can demodulate it as if it were the modulation state 339 at the same phase.

If the subject message element and the intruder signal are separated by one phase step, they combine to generate a superposition signal at an amplitude of about 1.6 amplitude units (circle 333) and a phase which is a weighted average of the contributing modulation states, which in this case is a phase midway between the two components. For example, state 337 is formed from the two modulation states closest in phase. The receiver can detect the faulted state, determine according to the amplitude that it is ambiguous and that the two contributing modulation states are different modulation states. The receiver can then demodulate the message twice, according to the two possible contributing modulation states, and test both versions.

If the subject message element and the intruder signal differ by two phase steps, or 144 degrees, the resulting superposition signal amplitude is about 0.6 amplitude units (circle 331), and a phase midway between the two components. For example, the ambiguous state 338 is formed from a collision of two non-adjacent modulation states as shown. However, in this case the phase of the resulting signal is the same as the phase of one of the modulation states (zero degrees in the example). The receiver can determine, from the amplitude, that the signal 338 represents an ambiguous state, and can determine which two modulation states contributed to the signal according to the observed phase, plus-or-minus 72 degrees, thereby indicating the two interfering modulation states. The receiver can then demodulate the subject message element two ways according to the contributing modulation states, and can test both versions against the error-detection code.

An advantage of the two-state modulation scheme of FIG. 3A, may be that most of the accessible states are either modulation states or unambiguous states. An advantage of the three-state modulation scheme of FIG. 3C, may be that the superposition signals are either 1 or 2 amplitude units, simplifying identification. An advantage of the five-state modulation scheme of FIG. 3D, may be that it encodes more bits per message element (specifically, 2.3 bits per element for the 5-state scheme, 1.6 bits per element for the 3-state scheme, and 1 bit exactly for the 2-state scheme). Many other phase-modulation schemes are possible, with modulation states selected for demodulating collided message elements into a single unambiguous modulation state or a small number of possible modulation states. In general, phase-modulation schemes with odd numbers of modulation states can be distributed around the entire phase circle, but phase-only modulation schemes with an even number of modulation states generally perform best if restricted to one quadrant of phase, such as the two-state scheme of FIG. 3A. This is because the superposition of a positive modulation state with a negative modulation state causes complete or nearly complete cancellation, in which case the receiver may have insufficient information from a null message element to determine which modulation state was intended, if any. In addition, modulation schemes with odd numbers of modulation states, larger than five or seven modulation states for example, can result in very small sum-signal amplitudes when the colliding modulation states are nearly 180 degrees apart in phase.

Figure 4:
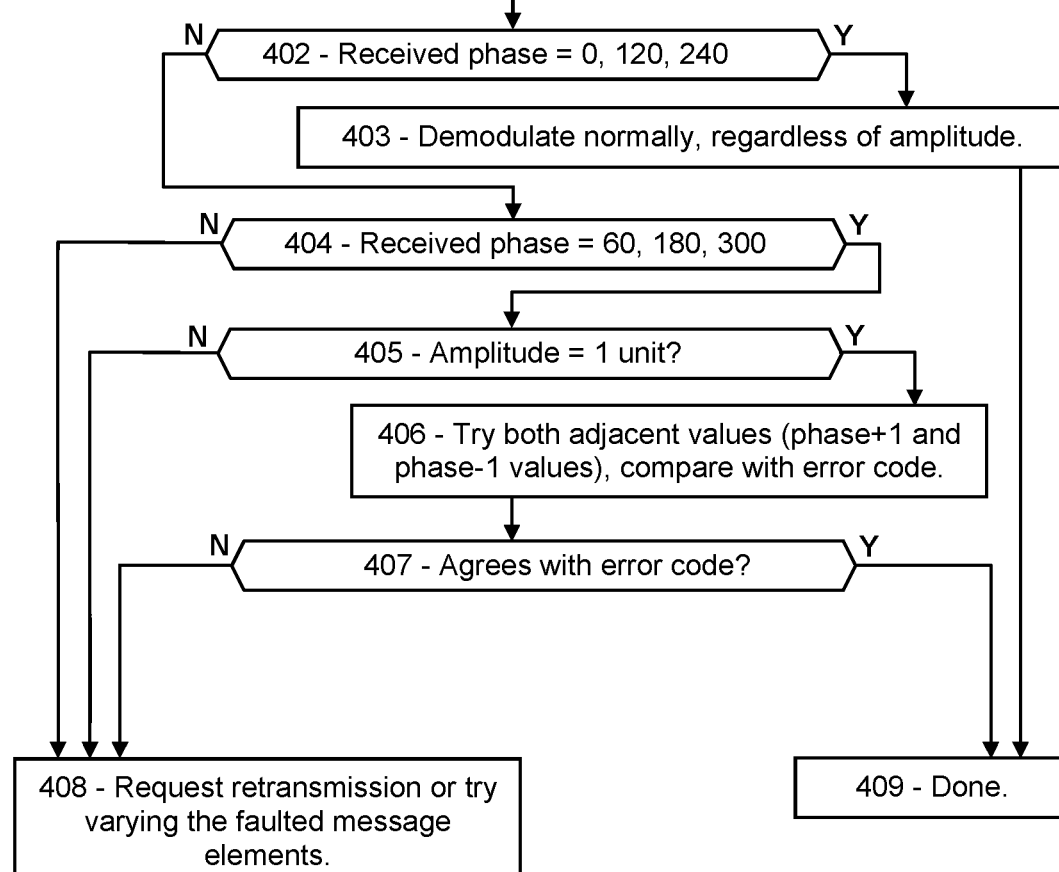
FIG. 4 is a flowchart showing an exemplary embodiment of a process for demodulating a phase-modulated message with interference, according to some embodiments.

FIG. 4 is a flowchart showing an exemplary embodiment of a process for demodulating a phase-modulated message with collisions, according to some embodiments. As depicted in this non-limiting example, at 401 a receiver receives a message modulated in 3PSK using only the modulation states with phases of 0, 120, and 240 degrees, as in FIG. 3C. To demodulate a particular message element, the receiver determines whether the particular message element is modulated according to one of the modulation state phases at 402, and if so, it demodulates the message element normally at 403 (for example, by comparing the phase to a predetermined calibration set of legal phase levels of the modulation scheme) and is done at 409. In this case (3PSK), all of the modulation states and all of the unambiguous states are demodulated based on phase alone, irrespective of the received amplitude, because the unambiguous collided states have the same phase as the subject message element, and therefore the amplitude is irrelevant. In a modulation scheme involving only phase modulation, interference that distorts the amplitude while leaving the phase unchanged may be correctly demodulated according to phase alone, as illustrated by states 323 and 324 in FIG. 3C.

If the received phase is not one of the legal phases of the modulation scheme, then at 404 the receiver determines whether the received phase has an intermediate value of 60, 180, or 300 degrees, and if so, the receiver checks the amplitude at 405. If the amplitude is the same as the amplitude of the modulation states (1 amplitude unit in this example) and the phase is intermediate between two modulation states, then the message element is one of the ambiguous but recoverable states such as 325. For example, if the received amplitude is 60 degrees, the subject message element may have been initially modulated at zero degrees or 120 degrees. After demodulating the rest of the message elements, the receiver can then try to determine the correct assignment for the collided message element by assigning the collided message element to each of the adjacent modulation states, and testing each version of the message with the error-detection code at 406. If either version agrees with the error-detection code at 407, the task is done. If not, or if the amplitude is not 1 unit at 405, then the receiver can request a retransmission.

If at 404 the phase of the received signal is not one of the legal phases nor one of the intermediate phases, then the receiver can determine that the message element is irretrievably faulted and can request a retransmission at 408. Alternatively, the receiver can try substituting each of the modulation states for the faulted message element in turn, or other message-recovery strategy according to network rules.

The following examples pertain to modulation schemes that employ both amplitude and phase modulation, but with modulation states selected to enable demodulation of collided messages.

Figure 5:
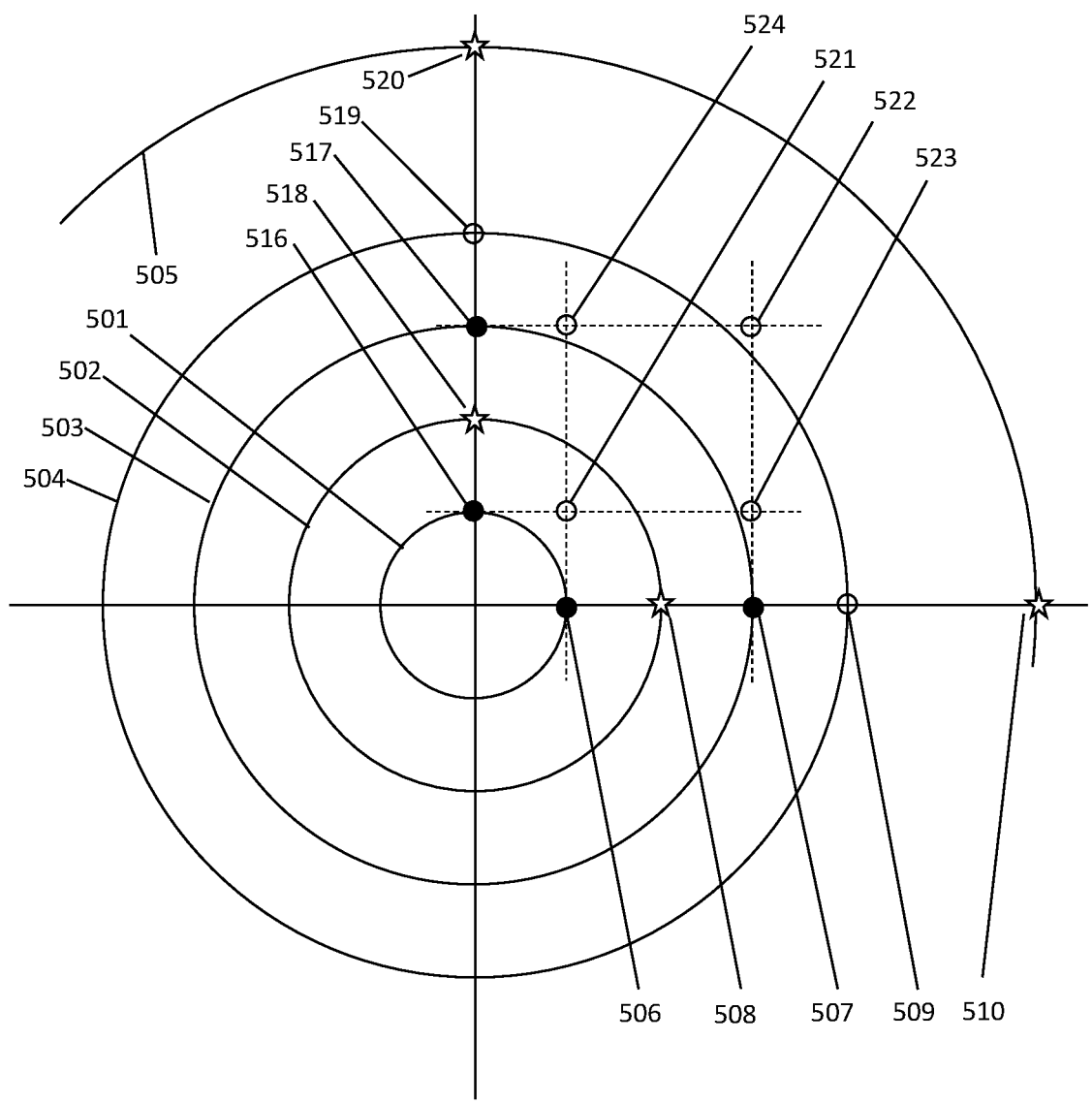
FIG. 5 is a phase chart showing an exemplary embodiment of states of a modulation scheme with both amplitude and phase modulation with interference, according to some embodiments.

FIG. 5 is a phase chart showing an exemplary embodiment of modulation states of a modulation scheme with both amplitude and phase modulation, and with collisions, according to some embodiments. As depicted in this non-limiting example, five amplitude levels are shown as circles: 501 corresponding to 1 unit, 502 with 2 units, 503 with 3 units, 504 with 4 units, and 505 with 6 units of amplitude. There are no relevant states with 5 units of amplitude in this example. The four modulation states are shown as dots such as modulation states 506 and 507 at zero phase with 1 and 3 amplitude units, respectively, and modulation states 516 and 517 at 90 degrees phase.

The other states are generated by a collision between a subject message element and an intruder signal modulated according to the same modulation scheme. There are four unambiguous sum-signals indicated by stars. For example, the unambiguous sum-signal 508 is the result of a collision between a subject message element and an intruder signal both modulated according to the modulation state 506, and hence the message element may be demodulated unambiguously as the modulation state 506. Likewise the superposition signal 510 is the superposition of two signals both modulated at the modulation state 507, and therefore can be unambiguously demodulated as state 507. Similarly, the 90-degree states 518 and 520 at 2 and 6 units of amplitude are unambiguous because they can be demodulated as the modulation states 516 and 517 respectively.

The ambiguous state 509 at zero degrees and 4 units of amplitude may be generated by a collision between a subject message element modulated as modulation state 506 and an intruder signal modulated as modulation state 507, or vice-versa. Hence, the sum-signal 509 is marked as ambiguous. The receiver can try each of the two component modulation states, 506 and 507, to determine which one is the originally modulated subject message element, by comparing with an error-detection code for example. Likewise, the superposition signal 519 indicates that the subject message element is modulated in either the modulation state 516 or 517.

Four additional superposition states 521, 522, 523, 524 are shown with both amplitude and phase modulation, corresponding to certain combinations of the modulation states as indicated by dotted lines. The ambiguous state 521 is the superposition of the two modulation states 506 and 516, both at 1 unit of amplitude but differing in phase by 90 degrees, so the receiver can try both of those modulation states in demodulating the message. Likewise the signal 522 may represent either modulation state 507 or 517. The signal 524 is the superposition of modulation states 517 and 506, while the signal 523 is the superposition of modulation states 507 and 516. Since the receiver has no way to determine which of the component modulation states is due to the subject message element, in each of these cases, the demodulation is ambiguous. In each case, the receiver can use the received amplitude and phase to narrow down the number of possible component states to just two modulation states, and can then test those two variations against the error-detection code.

The receiver can save substantial time by using the modulation scheme logic to narrow down the number of message variations required for message recovery, instead of testing all of the modulation states in the modulation scheme, which may be prohibitively expensive. For example, if a message includes multiple collided message elements, the receiver can substitute the possible component modulation states according to the observed amplitude and phase, and can avoid testing the other combinations that are incompatible with the observed amplitude and phase. In this case, the number of possible modulation states for each collided ambiguous state is just two possibilities, rather than the four modulation states. Thus the receiver can save time by testing only those two possible modulation states, since there is no need to test the other modulation states that do not contribute to the observed signal. To consider a specific example, the message may have six collided message elements with ambiguous signals, in which case the receiver could find the correct modulation states for all of the collided message elements by testing, at most, only 36 versions. In contrast, if the receiver tested all combinations of the modulation states in each of the six faulted message elements, the number of tests would be 1296 possible versions. Hence the modulation scheme, including only modulation states that do not combine to each other in superposition, can greatly reduce the number of variations needed to resolve ambiguities and recover a collided message, according to some embodiments.

Figure 6:
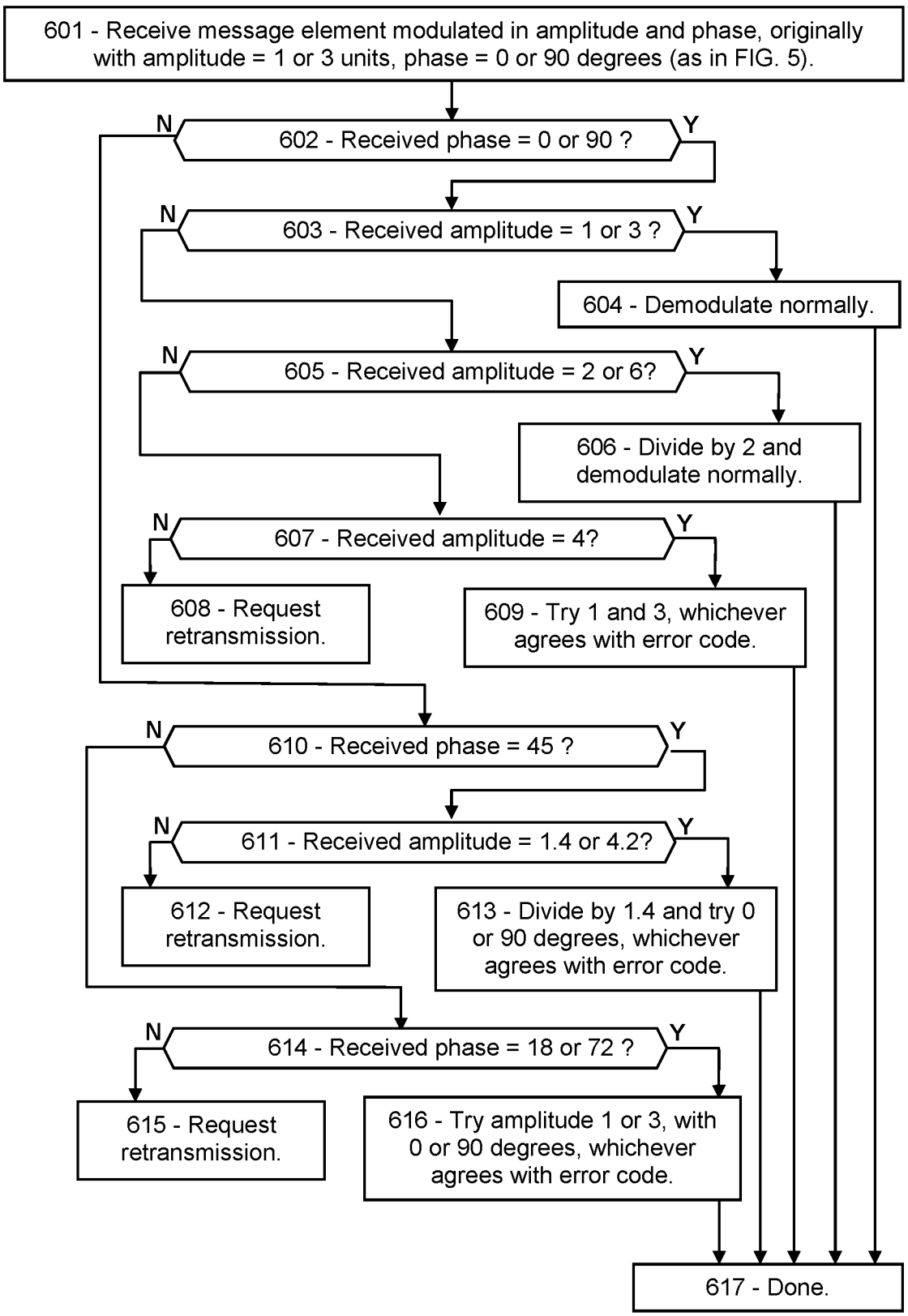
FIG. 6 is a flowchart showing an exemplary embodiment of a process for demodulating a message with amplitude and phase modulation, according to some embodiments.

FIG. 6 is a flowchart showing an exemplary embodiment of a process for demodulating a message with amplitude and phase modulation, according to some embodiments. As depicted in this non-limiting example, at 601 a receiver receives a message modulated according to a modulation scheme with, in this case, four modulation states at 1 or 3 amplitude units and zero or 90 degrees phase. The receiver recovers the intended subject message, despite collisions with an intruder signal modulated according to the same scheme.

At 602, the receiver checks that the received phase is either zero or 90 degrees. If so, at 603 it checks that the amplitude is 1 or 3 units. If so, then at 604 the receiver determines that the message element is not collided, and demodulates as usual, by comparing the measured amplitude and phase values to a calibration set of predetermined amplitude and phase levels of the modulation scheme, selecting the closest match, and is done at 617.

If at 603 the amplitude is not 1 or 3 units, the receiver can check at 605 if the amplitude is 2 or 6 units, in which case the receiver can determine that the signal is an unambiguous combination of two identical modulation states, and can therefore divide the amplitude by 2 and demodulate normally at 606.

If at 605 the amplitude is none of the above, the receiver can check if the amplitude is 4 units at 607, and if so, can try both 1 unit and 3 units of amplitude with the same phase, testing each variation with the error-detection code at 609. This state corresponds to 509 or 519 of the previous figure. However, if the amplitude is not one of 1, 2, 3, 4, or 6 the receiver can determine that the message element is faulted and can request a retransmission at 608.

Up to this point in the chart, only zero or 90 degree phases have been considered. At 602, if the phase is not zero nor 90, then at 610 the receiver can check if the phase is 45 degrees, and if so, can check at 611 if the received amplitude is 1.4 or 4.2 units, and if so, the receiver can deduce the amplitude of the subject message element by dividing the received amplitude by 1.414, thereby obtaining either 1 or 3 amplitude units. These correspond to the ambiguous states 521 and 522 of the previous figure. The receiver can then try two versions of the message element, with phases of zero or 90 degrees, and can test each with the error-detection code at 613. However, if at 611 the phase is 45 and the amplitude is not 1.4 or 4.2, then the receiver can determine that the message element is not recoverable and request a retransmission at 612.

If, at 610, the phase is not zero or 45 or 90 degrees, then at 614 the receiver can check if the phase is 18 or 72 degrees. These correspond to the states 523 and 524 of the previous figure. If the phase is 18 degrees, then the receiver can try either 507 or 516 (that is, 3 units amplitude at zero degrees, or 1 unit at 90 degrees), whereas if the phase is 72 degrees, the receiver can try 506 or 517 (3 units at 90 degrees, or 1 unit at zero degrees), testing each version against the error-detection code at 616. Optionally, the receiver can also check the amplitude of these signals, which should be about 3.2 units, and reject the message otherwise.

If the received phase is none of the above, or if the phase and amplitude are inconsistent with the modulation states of the modulation scheme, then the receiver can request a retransmission at 615. It may be noted that, although the logic appears complicated when described in words, each step in this procedure is elementary, so even a reduced-capability processor should be able to perform the logical steps.

The foregoing examples pertain to classical amplitude and phase modulation of the transmitted signal. The following examples include pulse-amplitude modulation PAM and its modifications to permit demodulation of collided message elements.

Figure 7A:
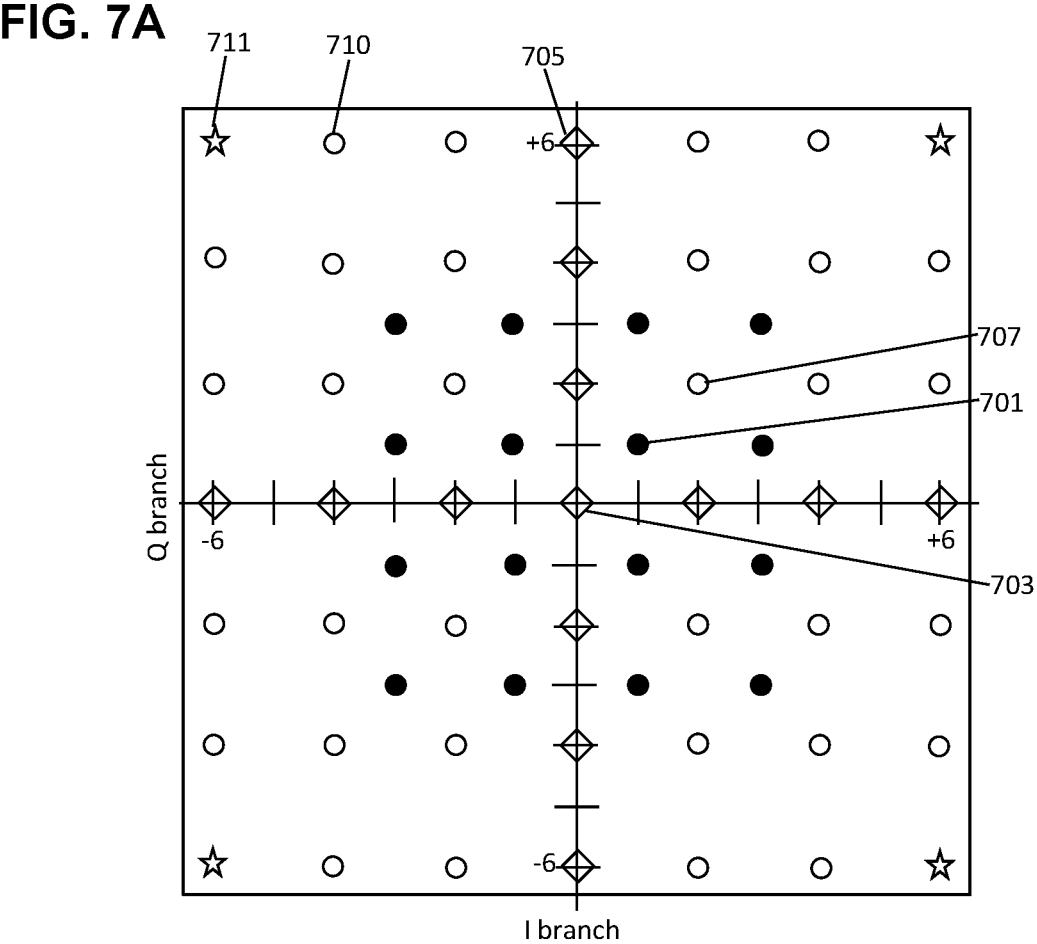
FIG. 7A is a constellation chart showing an exemplary embodiment of states of a PAM modulation scheme with interference, according to some embodiments.

FIG. 7A is a constellation chart showing an exemplary embodiment of the modulation states of a PAM modulation scheme with collisions, according to some embodiments. As depicted in this non-limiting example, a constellation chart displays the modulation states of a message element according to its I-branch and Q-branch signals on orthogonal axes. The Q-branch is 90-degrees offset relative to the I-branch. They are both modulated in positive and negative amplitudes (negative amplitudes corresponding to a 180-degree phase change). The branch amplitude axes are marked at 1-unit intervals out to +/−6 units. The displayed chart is for 16QAM with PAM modulation, showing 16 modulation states as dots 701. Four unambiguous states 711 are shown as stars, each unambiguous state corresponding to a subject message element with 3-unit branch amplitudes in both I and Q branches, added to an intruder signal which is also modulated as I=3, Q=3. Ambiguous sum signals are shown as small circles such as 710. The ambiguous states can be generated by many different combinations of the modulation states. For example, the ambiguous state 707 can be generated by a subject message element with branch amplitudes of (I=+3, Q=+1) collided with an intruder at (I=−1, Q=+1), or alternatively by a subject (I=−1, Q=−1) collided with an intruder (I=+3, Q=+3), or alternatively by (I=+3,Q=−1) with (Q=−1, I=+3), to mention just a few of the possible combinations.

Diamonds such as 705 indicate "null" states with zero transmission in one or both of the branches. For example, the diamond at 705 corresponds to a subject element at (I=+1, Q=+3) combined with an intruder at (I=−1, Q=+3), or vice-versa, among other possibilities in which the I-branch amplitude cancels to zero. Diamonds along the I-branch axis correspond to cancellation of the Q-branch amplitudes. In addition, the central point 703 corresponds to cancellation of both the I and Q amplitudes, such as a subject message element with branch amplitudes of (I=+1, Q=+1), combined with an intruder having (I=−1, Q=−1), or vice-versa, among many other possibilities. Since the positive and negative values cancel each other, the sum-signal is zero.

It is difficult for the receiver to demodulate the message when there are so many possible combinations. Therefore a restricted set of modulation states may be employed, as described in the next example.

Figure 7B:
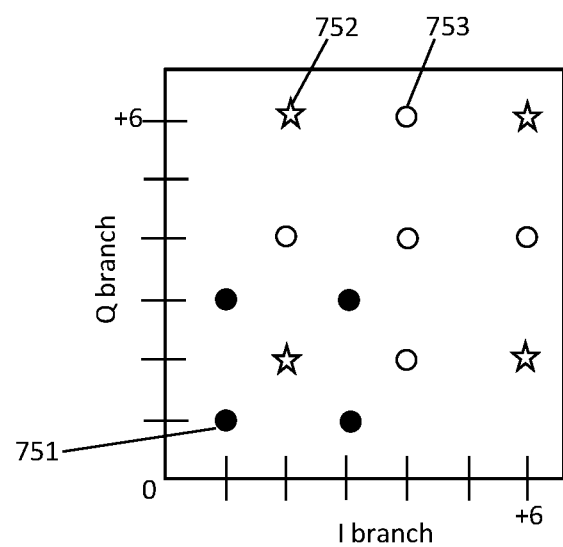
FIG. 7B is a constellation chart showing an exemplary embodiment of states of a modified PAM modulation scheme with interference, according to some embodiments.

FIG. 7B is a constellation chart showing an exemplary embodiment of the modulation states of a modified PAM modulation scheme with collisional interference, according to some embodiments. As depicted in this non-limiting example, the modulation states are restricted to the positive quadrant (0 to 90 degrees), including four modulation states shown as dots 751. The modulation states have 1 or 3 amplitude units in both I and Q branches. Four unambiguous signals such as 752 are shown as stars. For example, 752 can be formed by adding a subject message element with (I=1, Q=3) to an intruder with the same modulation (I=1, Q=3). The state 752 is unambiguous because there is only one way to construct it from the modulation states, and the contributions from the subject and intruder are identical; hence the receiver can demodulate the unambiguous signal by dividing the branch amplitudes by 2. The lack of any negative amplitude states in the restricted modulation scheme enables these unambiguous states 752 because they allow only one way to construct the sum-signal 752.

The remaining five ambiguous states, shown as circles such as 753, are ambiguous because they can be generated in at least two different ways. For example, 753 can be formed by a message element with (I=+1, Q=+3) collided with an intruder at (I=+3, Q=+3), or it can be formed from a subject (I=+3, Q=+3) collided with intruder (I=+1, Q=+3), and therefore the receiver needs to consider both versions. The number of versions that the receiver needs to test, on average, to find the correct message demodulation has been greatly reduced, relative to that of FIG. 7A, since the modulation states are restricted to one quadrant with positive amplitudes. With the reduced number of possibilities, the receiver may demodulate the message even if several message elements are collided, and may do so faster than by waiting for a retransmission, according to some embodiments.

Figure 8:
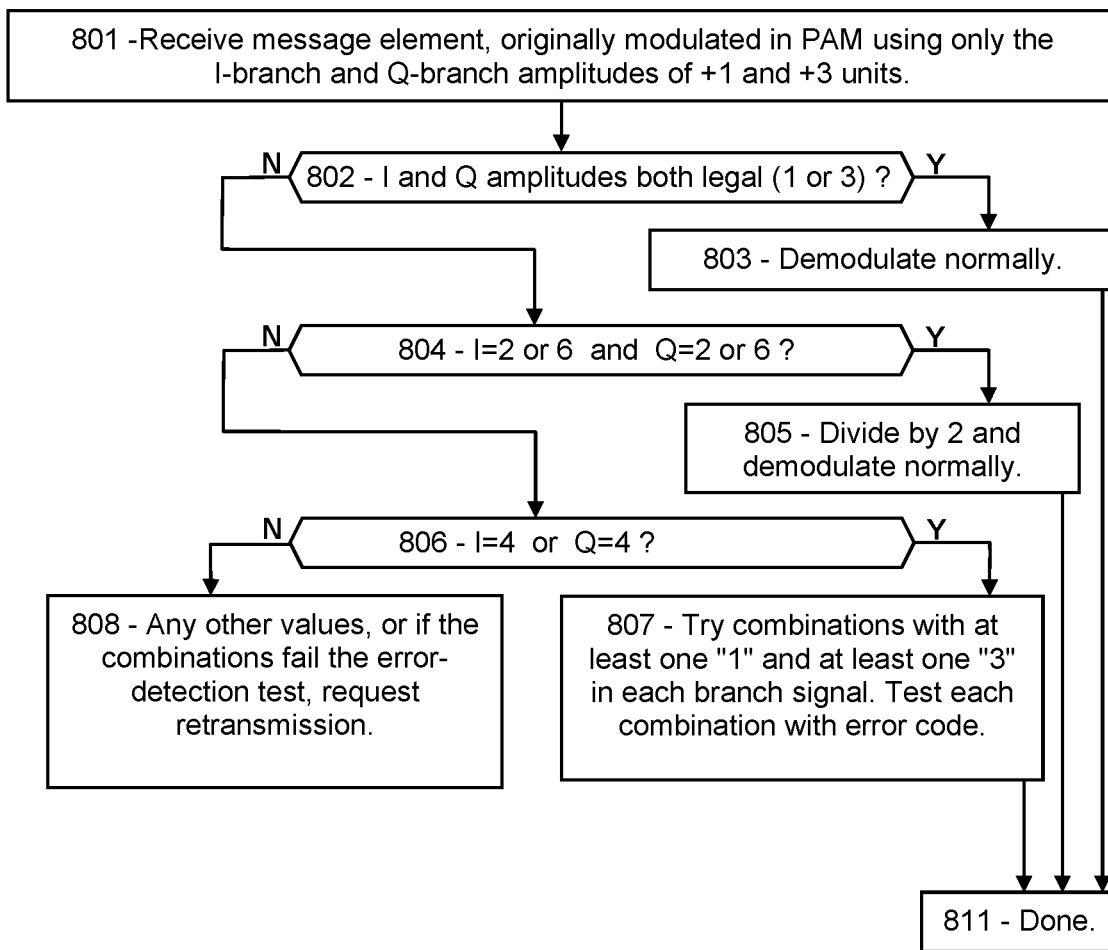
FIG. 8 is a flowchart showing an exemplary embodiment of a procedure for demodulating a message with PAM modulation and interference, according to some embodiments.

FIG. 8 is a flowchart showing an exemplary embodiment of a procedure for demodulating a message with PAM modulation and interference, according to some embodiments. As depicted in this non-limiting example, at 801 a receiver receives a message element which was modulated by the transmitting entity in PAM according to a restricted modulation scheme with positive I-branch and Q-branch modulation states of +1 and +3 amplitude units only. At 802, the receiver determines whether the message element is one of the modulation states, with branch amplitudes of +1 or +3 units. If so, the receiver demodulates the message element normally at 803 and is done at 811. If not, then at 804 the receiver checks whether the received I-branch amplitude is +2 or +6 units, and the Q-branch amplitude is +2 or +6, in which case the state is an unambiguous one, the receiver can divide each branch amplitude by 2, and can then demodulate normally at 805.

At 806, the receiver determines whether the I or Q branch amplitude equals 4 units, implying an ambiguous combination of +1 and +3 units. In this case, the receiver can try to find the correct combination by varying the I and Q amplitudes as +1 and +3 units at 807, consistent with the observed I and Q values, while testing each message version with the error-detection code. For example, a state may have branch amplitudes of (I=2, Q=4), in which case the state may be made from a subject message element with (I=1, Q=1) and an intruder with (I=1, Q=3), or a subject with (I=1, Q=3) and an intruder with (I=1, Q=1). The receiver can try both possibilities, testing each against the error-detection code until the correct message is found. Each of the other ambiguous states can be generated in two different ways, and therefore the receiver can find the correct message element modulation by testing those two versions.

If at 806 the branch amplitudes are equal to none of the levels listed, or if all of the variations fail the error-detection test, then the receiver can request a retransmission at 808.

The disclosed systems and methods, implemented in certain embodiments, can provide demodulation for collided messages in which the subject message and the intruder are both modulated according to a restricted set of modulation states which are selected so that no modulation state equals a superposition of two other modulation states. The receiver can demodulate the message elements that exhibit one of the modulation states in the normal way, by comparing the modulation levels of the received signal to certain predetermined modulation levels in a calibration set, which may be provided by a previous demodulation reference, for example. In addition, certain superposition states differ from the modulation states due to a collision, but are nonetheless unambiguous since they can be formed in only one way, from identical subject and intruder signals. Therefore the receiver can demodulate those unambiguous signals by dividing by 2 and demodulating normally. In many cases, there are also ambiguous states which can be generated by more than one combination of modulation states, in which case the receiver can recover the original subject message by assigning each collided message element to each of the modulation states that could have contributed to the observed sum-signal state, while comparing the resulting message to an error-detection code or parity or the like. In addition, in some cases the observed modulation values of the message element are incompatible with all of the modulation states, and all combinations of the modulation states, of the modulation scheme. In that case, the message element is faulted (other than a simple collision). Likewise, if all of the message versions fail the error-detection test, then the message is somehow faulted. In either case, the receiver can request a retransmission of the message. In many cases of collided messages, if the subject message and the intruder signal are both modulated according to the same restricted modulation scheme, the receiver can demodulate the original message and avoid the delays and costs involved in waiting for a retransmitted version of the message, according to some embodiments.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a user device, in signal communication with a base station of a wireless network, to modulate an uplink message comprising message elements, the method comprising:
   receiving, from the base station, a modulation scheme comprising one or more amplitude levels, one or more phase levels, and one or more modulation states, each modulation state comprising at least one of the amplitude levels and at least one of the phase levels, wherein each modulation state is unequal to all superpositions of any two modulation states;
   modulating each message element according to one of the modulation states; and
   transmitting the message to the base station;
   wherein a superposition of two modulation states comprises a signal produced by receiving the two modulation states overlapping in time.

2. The method of claim 1, wherein the message is transmitted according to 5G or 6G technology.

3. The method of claim 1, wherein the modulation scheme comprises exactly two amplitude levels with amplitudes of 1 and 3 times an arbitrary unit, respectively.

4. The method of claim 1, wherein the modulation scheme comprises exactly one amplitude level and exactly two phase levels differing by 90 degrees.

5. The method of claim 1, wherein the modulation scheme comprises exactly one amplitude level and exactly three phase levels separated by 120 degrees.

6. The method of claim 1, wherein the modulation scheme comprises exactly one amplitude level and exactly five phase levels separated by 72 degrees.

7. The method of claim 1, wherein the modulation scheme comprises exactly two amplitude levels with amplitudes of 1 and 3 times an arbitrary unit, respectively, and exactly two phase levels differing by 90 degrees.

8. The method of claim 1, wherein the modulation scheme comprises an I branch and a Q branch phase-shifted relative to the I branch by 90 degrees, each branch amplitude modulated according to exactly two amplitude levels with amplitudes of 1 and 3 times an arbitrary unit, respectively.

9. Non-transitory computer-readable media in a base station of a wireless network, the base station in signal communication with two or more user devices, the media including instructions that when executed in a computing environment cause a method to be performed, the method comprising:
    determining a plurality of modulation states of a modulation scheme, the modulation scheme comprising one or more amplitude levels and one or more phase levels, each modulation state comprising at least one of the amplitude levels and at least one of the phase levels, wherein each modulation state differs, in amplitude or phase or both, relative to all superpositions of any two modulation states;
    receiving a message comprising message elements; and
    for each particular message element, determining whether the particular message element is modulated according to one of the modulation states, and if so, demodulating the particular message element according to the modulation state.

10. The media of claim 9, the method further comprising:
    determining whether the particular message element is modulated according to a superposition of two identical modulation states, and if so, dividing a phase or amplitude of the particular message element by two, and then demodulating the resulting message element according to the modulation identical modulation states.

11. The media of claim 10, the method further comprising:
    determining whether the particular message element is modulated according to a superposition of two different modulation states, and if so, demodulating the particular message element according to each of the different modulation states.

12. The media of claim 11, the method further comprising:
    constructing, for each of the different modulation states, a different version of the message, respectively;
    receiving an error-detection code or parity associated with the message;
    comparing each of the different versions of the message to the error-detection code or parity, and determining whether any of the different versions of the message agrees with the error-detection code or parity; and
    demodulating the message according to whichever of the different versions of the message agrees with the error-detection code or parity.

13. The media of claim 11, the method further comprising:
    determining whether the particular message element is inconsistent with all of the modulation states and any superposition of two modulation states, and if so, determining that the particular message element is corrupted.

14. The media of claim 13, the method further comprising:
    constructing, for each of the modulation states, a different version of the message, respectively;
    receiving an error-detection code or parity associated with the message;
    comparing each of the different versions of the message to the error-detection code or parity, and determining whether any of the different versions of the message agrees with the error-detection code or parity; and
    demodulating the message according to whichever of the different versions of the message agrees with the error-detection code or parity.

15. The media of claim 9, wherein the demodulating the particular message element according to the modulation scheme comprises:
    determining which particular modulation state comprises the same amplitude and the same phase as the particular message element;
    determining a number associated with the particular modulation state; and
    assigning the number to the particular message element.

16. A user device in signal communication with a base station of a wireless network, the user device comprising a processor configured to:
    receive, from the base station or a network, system information specifying a modulation scheme comprising one or more amplitude levels, one or more phase levels, and a plurality of modulation states, each modulation state incompatible with all superpositions of any two other modulation states;
    modulate a message according to the modulation scheme;
    transmit the message to the base station; and
    wherein a superposition of two modulation states comprises a signal produced by receiving the two modulation states overlapping in time.

17. The user device of claim 16, wherein each modulation state comprises an amplitude level of the modulation scheme or a phase level of the modulation scheme or both.

18. The user device of claim 17, wherein a first modulation state is incompatible with all superpositions of any two modulation states when, for every particular superposition of any two modulation states, an amplitude of the particular superposition is unequal to an amplitude of the first modulation state, or a phase of the particular superposition is unequal to a phase of the first modulation state.

19. The user device of claim 16, wherein the processor is further configured to transmit, proximate to the message, a demodulation reference comprising a maximum amplitude level and a minimum amplitude level of the modulation scheme, or a maximum phase level and a minimum phase level of the modulation scheme.

20. The user device of claim 16, wherein the processor is further configured to transmit, associated with the message, an error-detection code configured to indicate when the message is correctly demodulated.

\* \* \* \* \*